(12) United States Patent
Hu

(10) Patent No.: US 12,438,313 B2
(45) Date of Patent: Oct. 7, 2025

(54) ROTATABLE CABLE COLLECTION SOCKET COMPONENT

(71) Applicant: Guoyuan Hu, Zhongshan (CN)

(72) Inventor: Guoyuan Hu, Zhongshan (CN)

( * ) Notice: Subject to any disclaimer, the term of this patent is extended or adjusted under 35 U.S.C. 154(b) by 329 days.

(21) Appl. No.: 18/327,582

(22) Filed: Jun. 1, 2023

(65) Prior Publication Data

US 2024/0405488 A1   Dec. 5, 2024

(51) Int. Cl.
*H01R 13/00*   (2006.01)
*H01R 13/717*   (2006.01)
*H01R 13/72*   (2006.01)

(52) U.S. Cl.
CPC ........... *H01R 13/72* (2013.01); *H01R 13/717* (2013.01)

(58) Field of Classification Search
CPC .............................. H01R 13/72; H01R 13/717
See application file for complete search history.

(56) References Cited

U.S. PATENT DOCUMENTS

| | | | | |
|---|---|---|---|---|
| 4,114,736 A * | 9/1978 | Scherenberg | .......... | H02G 11/02 242/385.4 |
| 5,590,749 A * | 1/1997 | Wagner | .................. | H02G 11/02 379/438 |
| 6,346,006 B1 * | 2/2002 | Smith | .................... | B60L 53/16 439/501 |
| 6,806,682 B2 * | 10/2004 | Hsiao | .................... | H02J 7/0042 320/111 |
| 6,994,592 B1 * | 2/2006 | Gannon | ............... | H01R 31/065 439/669 |
| 7,688,563 B2 * | 3/2010 | O'Rourke | .............. | H02H 7/228 361/103 |
| 7,834,198 B2 * | 11/2010 | Takimiya | ............. | C07D 513/04 549/42 |
| 7,905,736 B2 * | 3/2011 | O'Rourke | .............. | H01R 13/73 439/505 |
| 9,392,349 B2 * | 7/2016 | Merenda | ................ | B65H 75/48 |
| 9,941,642 B1 * | 4/2018 | Waggoner | ............. | H01R 13/66 |
| 2024/0405488 A1 * | 12/2024 | Hu | ......................... | H01R 13/72 |

FOREIGN PATENT DOCUMENTS

CN         208580924 U     3/2019

* cited by examiner

*Primary Examiner* — Phuong Chi Thi Nguyen

(57) ABSTRACT

The present disclosure provides a rotatable cable collection socket component, including: a fixed housing; a rotatable surface housing, movably arranged on a side of the fixed housing and rotatable relative to the fixed housing; a plug wire body, movably wound on the rotatable surface housing and penetrating the fixed housing; a cover plate or a bottom housing, fixedly arranged under the rotatable surface housing and rotatable driven by a rotation of the rotatable surface housing; a circuit board; at least one plug-in assembly, fixedly arranged on the cover plate or the bottom housing and electrically connected to the circuit board, and an electrical device is capable of being electrically detachably connected to a corresponding plug-in assembly; and at least one charging interface, arranged on the circuit board and penetrating the rotatable surface housing, and the electronic device is capable of being charged through a corresponding charging interface.

13 Claims, 8 Drawing Sheets

ROTATABLE CABLE COLLECTION SOCKET COMPONENT

CROSS REFERENCE

The present disclosure claims priority of Chinese Patent Application No., filed on, the entire contents of which are hereby incorporated by reference in their entirety.

TECHNICAL FIELD

The present disclosure relates to a rotatable cable collection socket component.

BACKGROUND

Socket is one of the essential household items in the process of daily life and work, and most of the existing sockets is arranged such that multiple jacks are defined on a single socket. When the socket being used, the power plug of each electrical device is required to be plugged into the jack on the socket. Because the jacks of the existing sockets are fixed, the spacing between the jacks is small. Therefore, when multiple electrical devices are used at the same time, the adjacent jacks cannot be used at the same time, resulting in a waste of jacks.

CN Patent No. CN208580924U provides a disc-type rotatable socket component, belongs to the technical field of socket assemblies, including a base, round sockets, and a socket disc. The socket disc is detachably arranged on the base and defines uniformly distributed round socket slot holes, where each round socket slot hole is arranged with a corresponding rotatable round socket. The bottom of the socket inside the jack is connected to an electrode head. The base is uniformly arranged with multiple electrode holders corresponding to the round sockets, where each electrode holder defines an annular blind slot corresponding to the electrode head on the round socket, an annular electrode piece being arranged in the annular blind slot. The electrode head extends into the annular blind slot and contacts the annular electrode piece. Although this technical solution can realize the socket can be rotated in the socket disc, which is convenient for the plug on the electrical appliance to be rotated to an appropriate position for placing, not easy to make the wire break damage, and prolong the service life, the following obvious defects still exist in the process of use: in the above socket component, an end of the power cord is connected to the main body of the socket component, and the other end is fixedly connected to the interior of the socket component; when not in use, the power cord is constantly exposed to the outside, which will lead to aging and wear of the power cord and the problem of safety hazards due to the impact of various external environments; especially when traveling out, the exposed power cord leads to inconvenient storage. Based on above, it is necessary to provide a rotatable cable collection socket component to solve the problem of inconvenient storage when traveling out due to the exposed power cord.

SUMMARY OF THE DISCLOSURE

One of the objectives of the present disclosure is to provide a rotatable cable collection socket component to facilitate the solution of the problem of inconvenient storage of the exposed cord body of the socket when the user travels outside.

The technical solution is implemented by the following.

A rotatable cable collection socket component, including: a fixed housing, being a hollow fixed cavity; a rotatable surface housing, movably arranged on a side of the fixed housing and rotatable relative to the fixed housing; a plug wire body, movably wound on the rotatable surface housing and penetrating the fixed housing; a cover plate or a bottom housing, fixedly arranged under the rotatable surface housing and rotatable driven by a rotation of the rotatable surface housing; a circuit board, fixedly arranged between the rotatable surface housing and the cover plate or the bottom housing; at least one plug-in assembly, fixedly arranged on the cover plate or the bottom housing and electrically connected to the circuit board, and an electrical device is capable of being electrically detachably connected to a corresponding plug-in assembly; and at least one charging interface, arranged on the circuit board and penetrating the rotatable surface housing, and the electronic device is capable of being charged through a corresponding charging interface.

In some embodiments, the fixed housing and the rotatable surface housing are both made of insulating material and cooperatively form a hollow cylinder.

In some embodiments, a side of the fixed housing defines a through hole passing through the side of the fixed housing, and the plug wire body penetrates the side of the fixed housing through the through hole.

In some embodiments, a bottom of the fixed housing or the bottom housing is arranged with a pad.

In some embodiments, the rotatable surface housing includes a housing body and a winding part; the winding part is arranged under the housing body, and the plug wire body is movably wound on the winding part.

In some embodiments, the housing body defines at least one set of socket holes and at least one interface hole that pass through the housing body; a position and number of the at least one set of socket holes correspond to a position and number of the at least one plug-in assembly, respectively; a position and number of the at least one interface hole correspond to a position and number of the at least one charging interface, respectively.

In some embodiments, a plurality of connection posts are arranged within the housing body, and the cover plate is fixed to an underside of the rotatable surface housing by means of screws cooperating with the plurality of connection posts.

In some embodiments, the winding part is a ring-shaped structure with a plug wire hole defined throughout, and the plug wire body is electrically connected to the circuit board through the plug wire hole.

In some embodiments, each plug-in assembly includes a fire plug-in and a zero plug-in; the fire plug-in is electrically connected to a fire wire, and the zero plug-in is electrically connected to a zero wire.

In some embodiments, each plug-in assembly further includes a ground plug-in electrically connected to a ground wire.

In some embodiments, three the plug-in assemblies are arranged symmetrically on the cover plate.

In some embodiments, the at least one charging interface is one or more of a Micro USB interface, a Type-C interface, and a Lightning interface.

In some embodiments, three the charging interfaces are arranged side by side on the circuit board, being a Micro USB interface, a Type-C interface, and a Lightning interface, respectively.

In some embodiments, at least one indicator light is arranged on the circuit board and penetrates the rotatable surface housing, configured to a working condition of the socket component.

Compared to the related art, the following technical effect can be achieved.

For the rotatable cable collection socket component proposed by the present disclosure when required to be used, the user use fingers to grasp the fixed housing and pull the plug wire body outward. In this way, due to the fact that the rotatable surface housing can rotate relative to the fixed housing, under the action of external force, the plug wire body drives the rotatable surface housing to rotate around the fixed housing, so as to achieve the line releasing operation; when unrequired to be used, the user use fingers to grasp the fixed housing and rotate the rotatable surface housing, such that the rotatable surface housing drives the plug wire body to rotate to be wound in the rotatable surface housing, so as to achieve the effect of wire collection. In this way, the plug wire body can be hidden for storage to get effective protection and aesthetic, and there will be less potential for damage of the plug wire body due to the impact of different external environment.

The rotatable cable collection socket component integrates the setting of multiple plug-in assemblies and multiple charging interfaces, which can simultaneously realize the dual function of power supply to multiple electrical devices and charging multiple electronic devices, thereby improving user satisfaction.

BRIEF DESCRIPTION OF THE DRAWINGS

In order to more clearly illustrate the technical solution of the embodiments of the present disclosure, the following drawings will be briefly described for use in the embodiments. It can be understood that the following drawings only illustrate certain embodiments of the present disclosure and therefore should not be regarded as limiting the scope, and other relevant drawings can be obtained according to these drawings without creative work for those skilled in the art.

Numeral reference: 11, first fixed housing; 111, first through hole; 112, first pad; 12, first rotatable surface housing; 121, housing body; 1211, socket hole; 1212, interface hole; 1213, indicator hole; 1214, connection post; 122, winding part; 1221, plug wire hole; 13, plug wire body; 14, cover plate; 15, circuit board; 16, plug-in assembly; 161, ground plug-in; 162, fire plug-in; 163, zero plug-in; 17, charging interface; 21, second fixed housing; 211, second through hole; 22, second rotatable surface housing; 23, bottom housing; 231, insulating body; 2311, second pad; 232, hardware; 24, plug wire body; 25, circuit board; 26, plug-in assembly; 261, ground plug-in; 262, fire plug-in; 263, zero plug-in; 27, charging interface.

DETAILED DESCRIPTION

In order to make the purpose, technical solutions, and advantages of embodiments of the present disclosure clearer, a clear and complete description of the technical solutions in embodiments of the present disclosure will be given below in conjunction with the accompanying drawings in the embodiments of the present disclosure, and it is clear that the embodiments described are a portion of the embodiments of the present disclosure and not all of them. The components of the embodiments of the present disclosure generally described and illustrated in the accompanying drawings herein may be arranged and designed in a variety of different configurations.

Embodiment I

Figure 1:
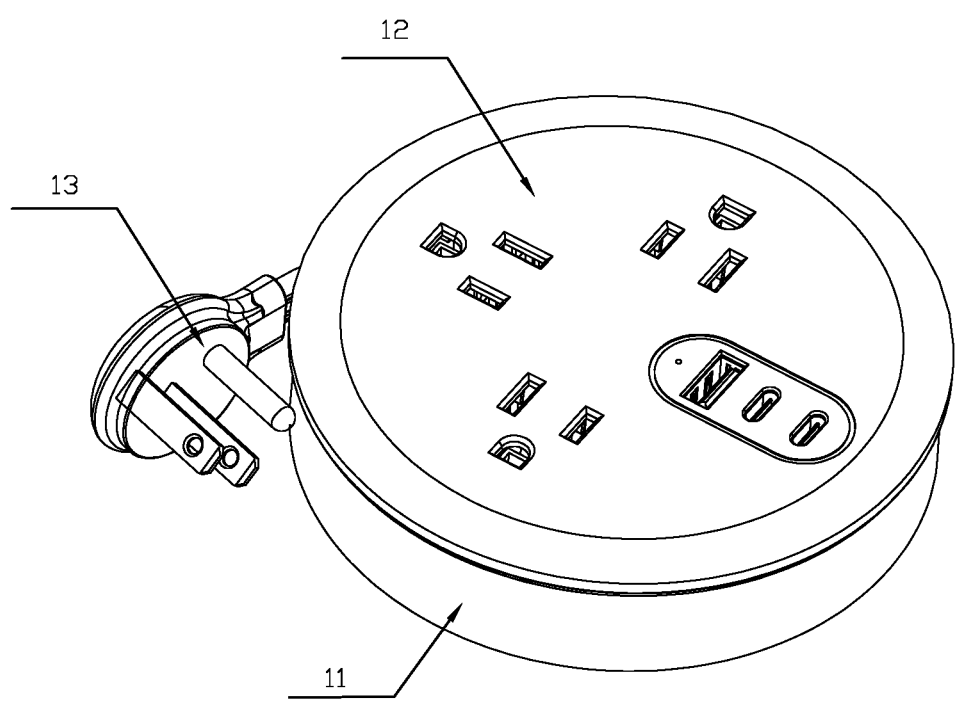
FIG. 1 is a structural schematic view of a rotatable cable collection socket component according to Embodiment I of the present disclosure.
Figure 2:
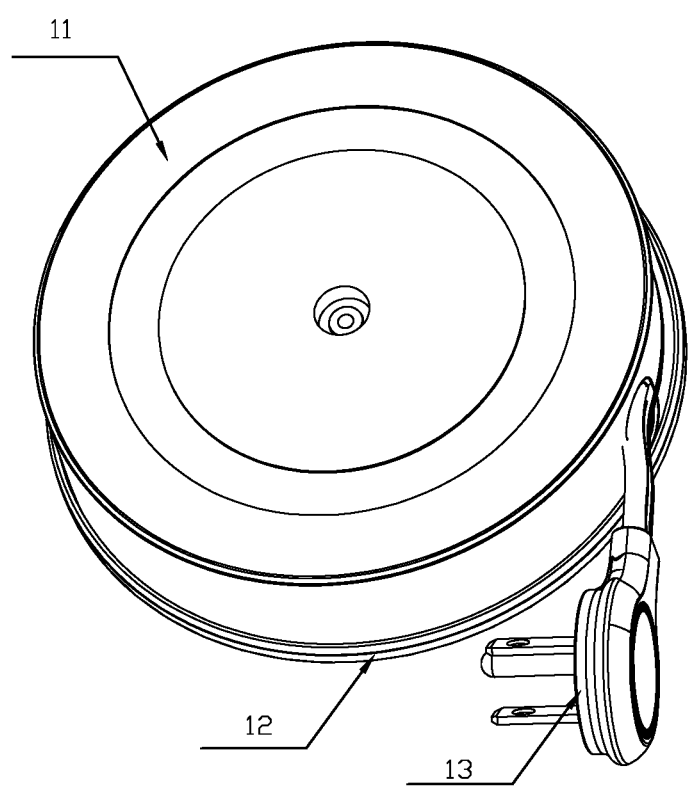
FIG. 2 is a structural schematic view of the rotatable cable collection socket component, as shown in FIG. 1, according to Embodiment I of the present disclosure in another angle of view.
Figure 3:
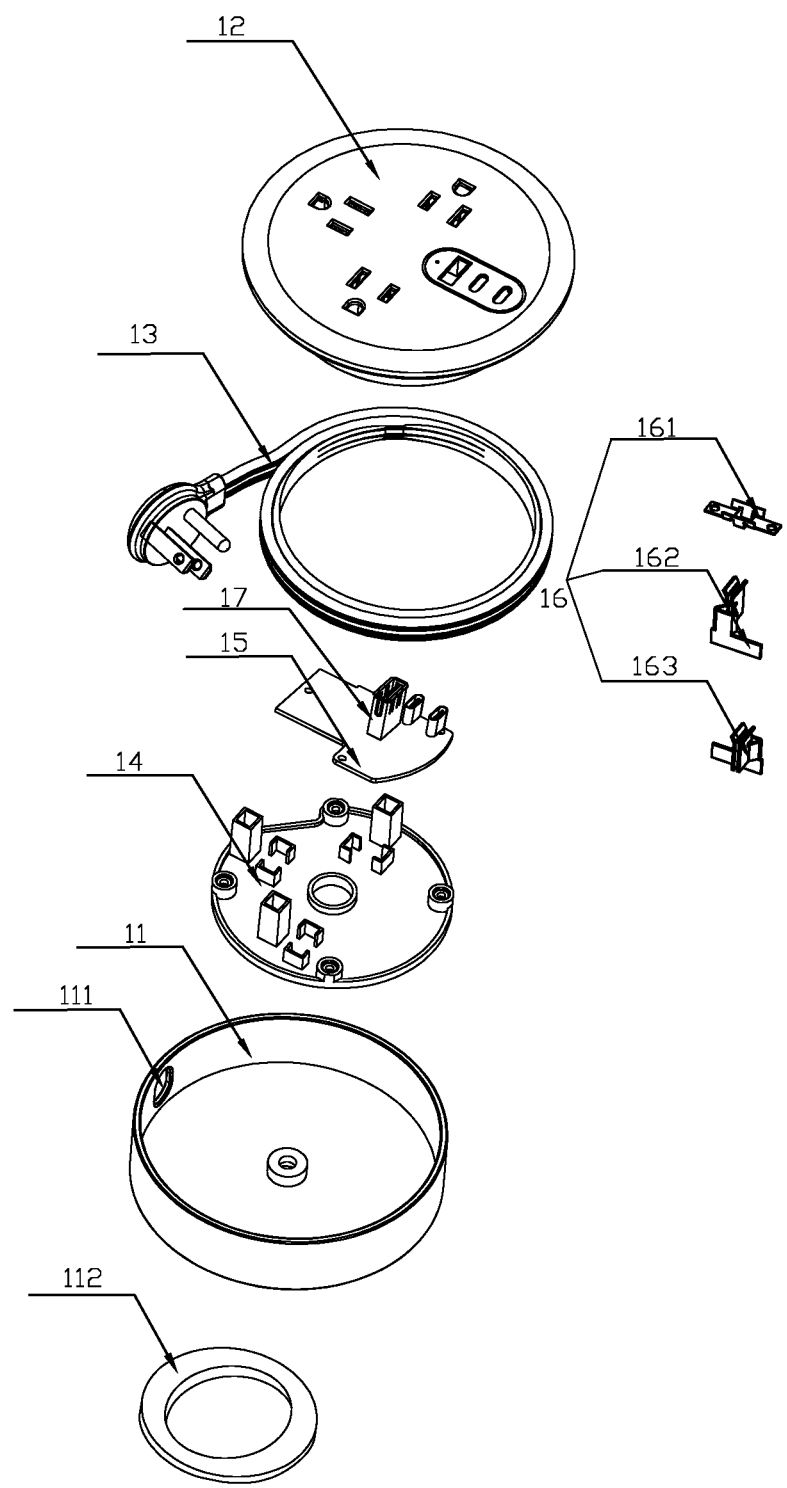
FIG. 3 is an exploded structural schematic view of the rotatable cable collection socket component, as shown in FIG. 1, according to Embodiment I of the present disclosure, including a rotatable surface housing.

Referring to FIGS. 1-3, in the embodiments, a rotatable cable collection socket component mainly includes a first fixed housing 11, a first rotatable surface housing 12, a plug wire body 13, a cover plate 14, a circuit board 15, at least one plug-in assembly 16, and at least one charging interface 17; the first fixed housing 11 is a hollow fixed cavity; the first rotatable surface housing 12 is movably arranged on a side of the first fixed housing 11 and is rotatable relative to the first fixed housing 11; the plug wire body 13 is movably wound on the first rotatable surface housing 12 and penetrates the first fixed housing 11, and the first rotatable surface housing 12 is rotatable to drive the plug wire body 13 to rotate, so as to achieve storage of the plug wire body 13; the cover plate 14 is fixedly connected under the first rotatable surface housing 12 and arranged in the first fixed housing 11, the cover plate 14 is electrically connected to the circuit board 15, and the cover plate 14 is movable relative to the first fixed housing 11 driven by the first rotatable surface housing 12; the circuit board 15 is fixedly arranged between the first rotatable surface housing 12 and the cover plate 14; the at least one the plug-in assembly 16 is fixedly arranged on the cover plate 14 and electrically connected to the circuit board 15, and an electrical device can be electrically detachably connected to a corresponding plug-in assembly 16 by means of a socket; the at least one charging interface 17 is arranged on the circuit board 15 and penetrates the first rotatable surface housing 12, enabling charging of the electronic device by means of a corresponding charging interface 17. The circuit board 15 is further arranged with at least one indicator light (not shown), and the at least one the indicator light penetrates the first rotatable surface housing 12, which serves to indicate the working condition of the socket component.

Referring to FIG. 3, in the embodiments, the first fixed housing 11 and the first rotatable surface housing 12 are both made of insulating material, both of which form a hollow cylinder; a side of the first fixed housing 11 defines a first through hole 111 passing through the side of the first fixed housing 11, and the plug wire body 13 penetrates the side of the first fixed housing 11 through the first through hole 111; a bottom of the first fixed housing 11 is arranged with a first pad 112, and the first pad 112 is a ring-shaped structure, the material of which is rubber; specifically, the material of the first pad 112 may be silicone; the function of the first pad 112 is to increase the height of the first fixed housing 11 and a contact surface.

Figure 4:
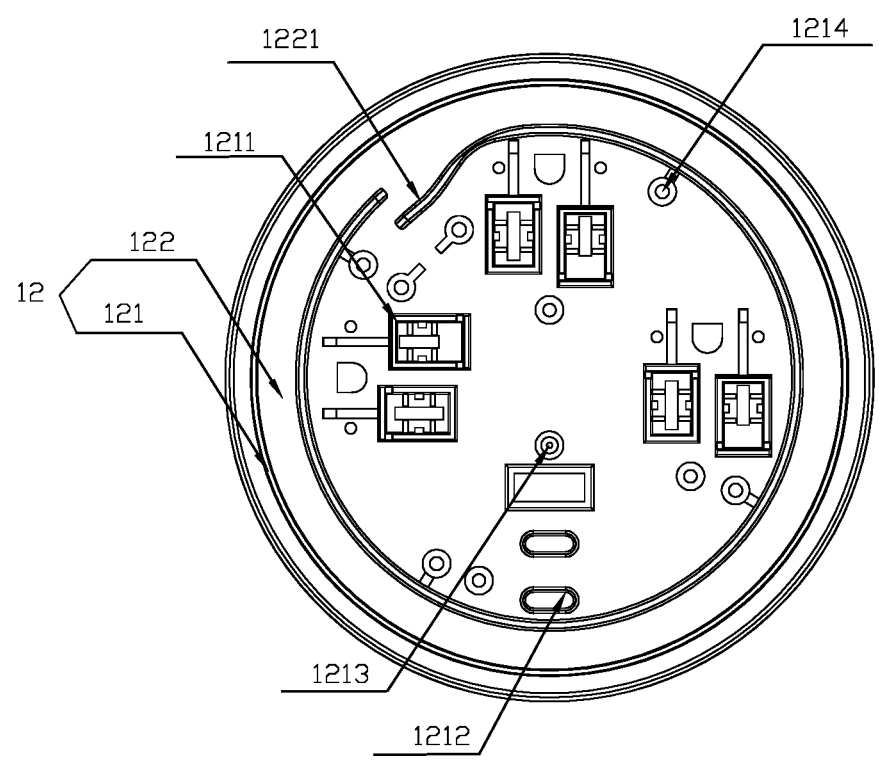
FIG. 4 is a bottom structural schematic view of the rotatable surface housing of the rotatable cable collection socket component, as shown in FIG. 3, according to Embodiment I of the present disclosure.
Figure 5:
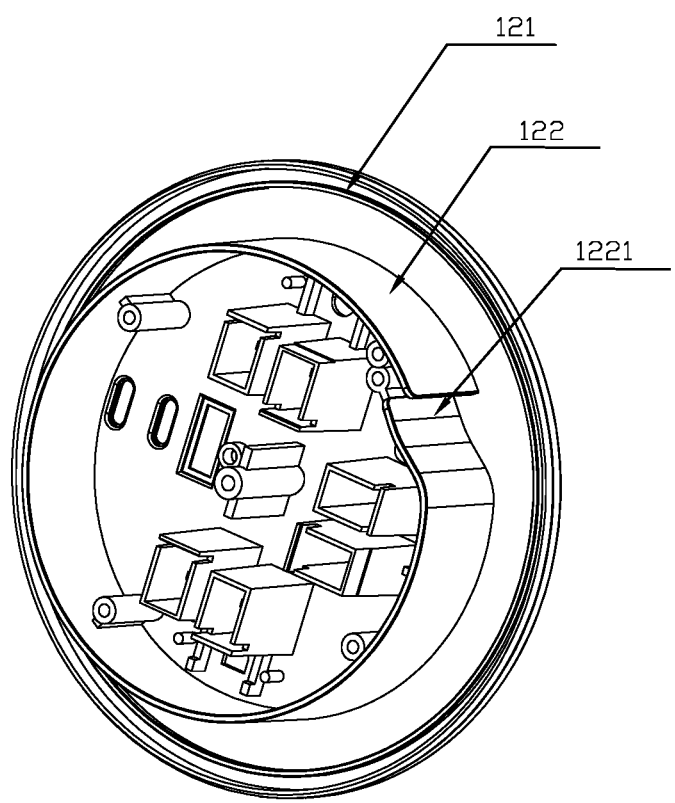
FIG. 5 is a structural schematic view of the rotatable surface housing of the rotatable cable collection socket component, as shown in FIG. 3, according to Embodiment I of the present disclosure.

Referring to FIGS. 3-5, in the embodiments, the first rotatable surface housing 12 includes a housing body 121 and a winding part 122; the winding part 122 is arranged under the housing body 121, the plug wire body 13 is movably wound on the winding part 122, and the plug wire body 13 is driven to be stored by rotating the housing body 121.

Referring to FIGS. 4 and 5, the housing body 121 defines at least one set of socket holes 1211, at least one interface hole 1212, and at least one indicator hole 1213 that pass through the housing body 121; the position and number of the at least one set of socket holes 1211 correspond to the position and number of the plug-in assemblies 16, respectively; the position and number of the at least one interface hole 1212 correspond to the position and number of the charging interfaces 17, respectively; the position and number of the at least one indicator holes1213 correspond to the location and number of the indicator lights (not shown), respectively; in the embodiments, three sets of the socket holes 1211, three the interface holes 1212, and one the indicator hole 1213 symmetrically penetrate a front of the housing body 121; in other embodiments, the number of the socket holes 1211, interface holes 1212, and indicator holes 1213 may be one, two, four, etc., the position and number of which correspond to the position and number of corresponding plug-in assembly 16, charging interface 17, and indicator light (not shown), respectively. In the embodiments, multiple connection posts 1214 are arranged within the housing body 121, and the cover plate 14 is fixed to an underside of the first rotatable surface housing 12 by means of screws cooperating with the corresponding connection posts 1214; in other embodiments, the cover plate 14 may be fixed to the underside of the first rotatable surface housing 12 by means of a snap structure.

Referring to FIGS. 4 and 5, the winding part 122 is a ring-shaped structure with a plug wire hole 1221 defined throughout, and the plug wire body 13 is electrically connected to the circuit board 15 through the plug wire hole 1221.

Referring to FIG. 3, in the embodiments, three the plug-in assemblies 16 are arranged symmetrically on the cover plate 14; in other embodiments, the number of the plug-in assemblies 16 may be one, two, four or most others, the number of which may be set according to actual needs. In the embodiments, the plug-in assembly 16 includes a ground plug-in 161, a fire plug-in 162, and a zero plug-in 163, where the ground plug-in 161, the fire plug-in 162, and the zero plug-in 163 are electrically connected with ground, fire, and zero wires respectively. In other embodiments, the plug-in assembly 16 may include only a fire plug-in 162 and a zero plug-in 163, where the fire plug-in 162 and the zero plug-in 163 are electrically connected to the fire wire and the zero wire, respectively.

Referring to FIG. 3, the charging interface 17 may be one or more of a Micro USB interface, a Type-C interface, and a Lightning interface; in the embodiments, three the charging interfaces 17 are arranged side by side on the circuit board 15, which are a Micro USB interface, a Type-C interface, and a Lightning interface, respectively.

Embodiment II

Figure 6:
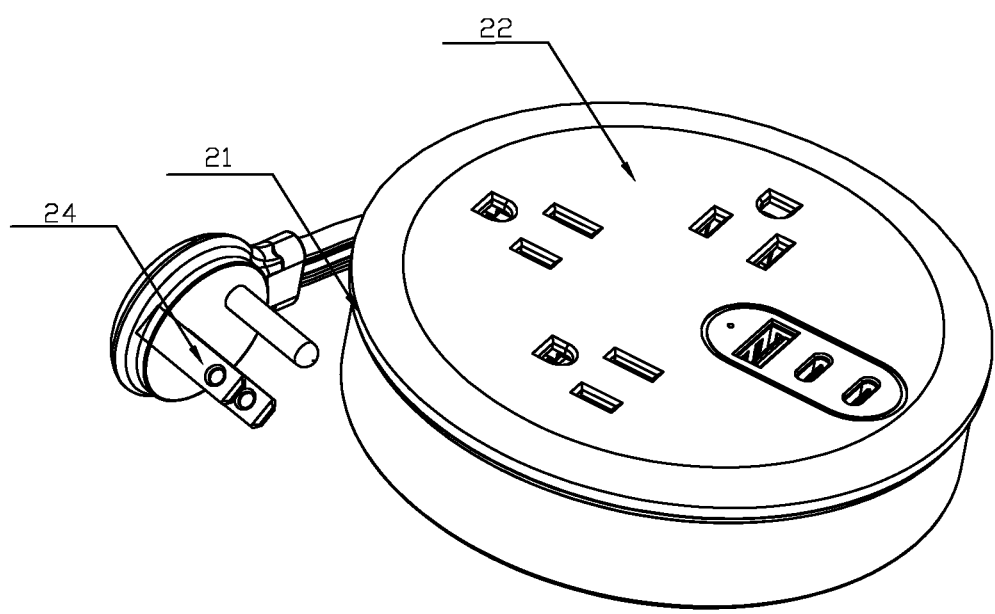
FIG. 6 is a structural schematic view of a rotatable cable collection socket component according to Embodiment II of the present disclosure.
Figure 7:
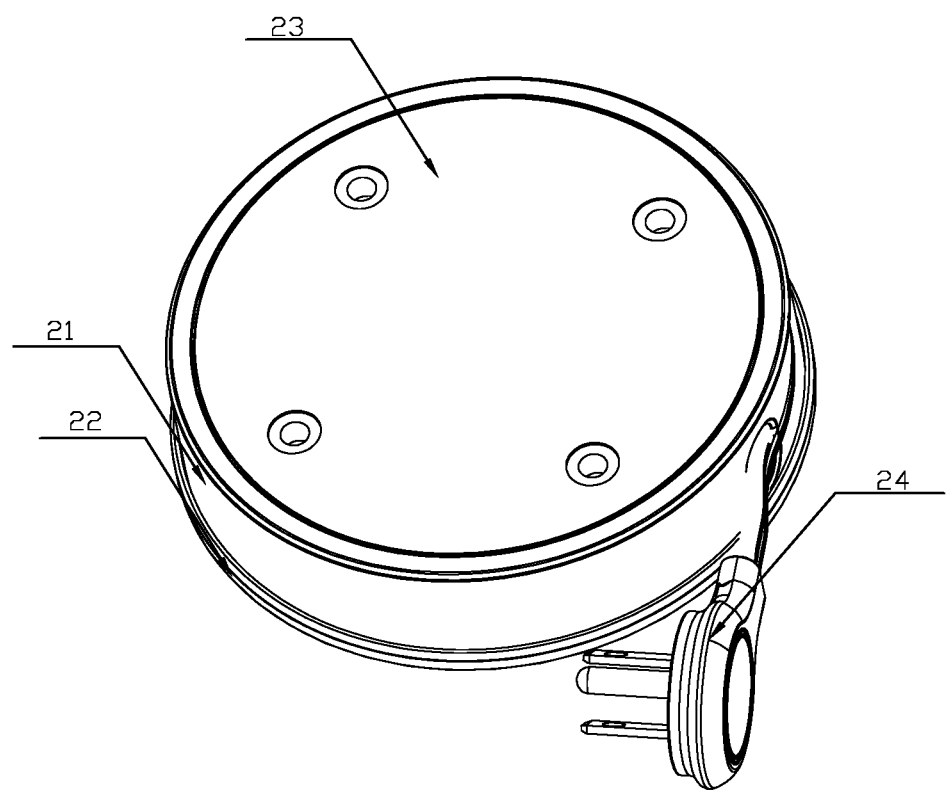
FIG. 7 is a structural schematic view of the rotatable cable collection socket component, as shown in FIG. 6, according to Embodiment II of the present disclosure in another angle of view.
Figure 8:
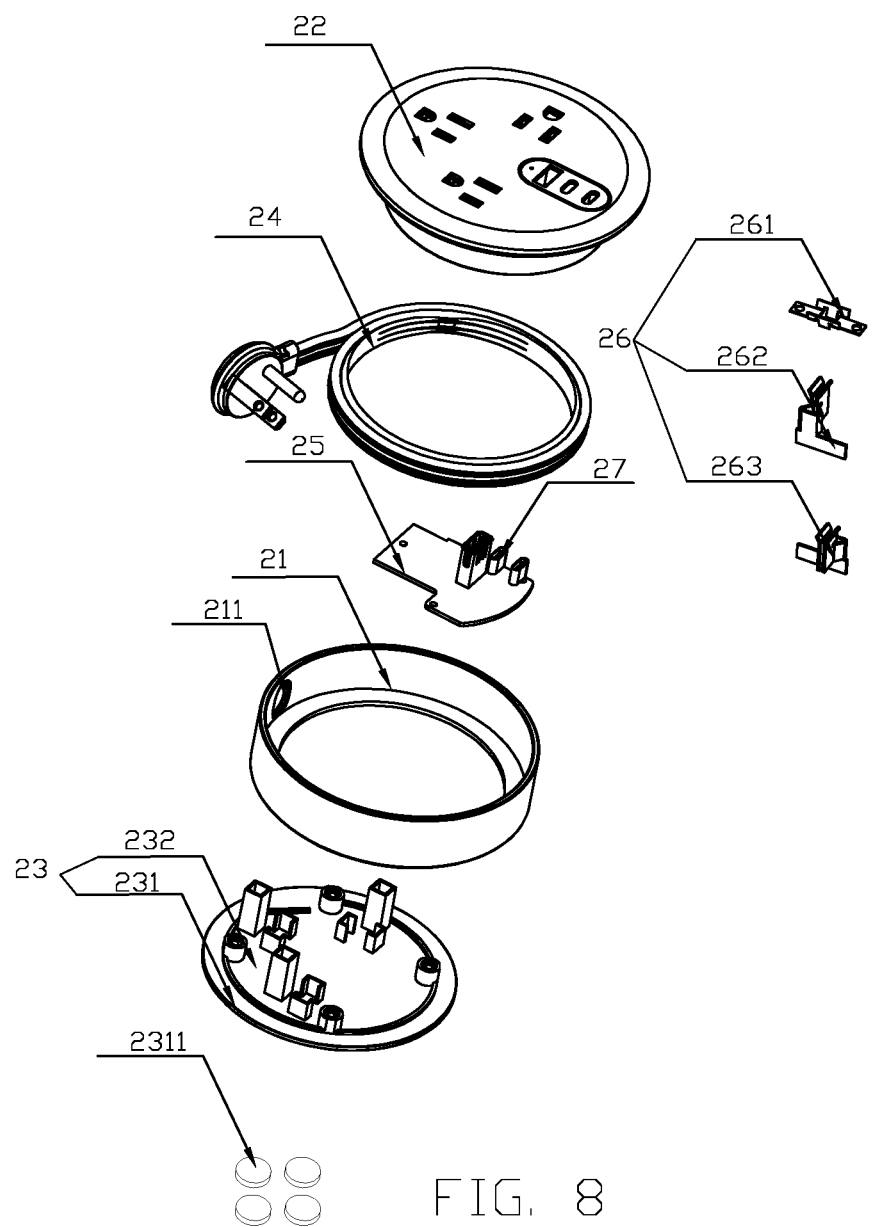
FIG. 8 is an exploded structural schematic view of the rotatable cable collection socket component, as shown in FIG. 6, according to Embodiment II of the present disclosure, including a rotatable surface housing.

Referring to FIGS. 6-8, in the embodiments, a rotatable cable collection socket component mainly includes a second fixed housing 21, a second rotatable surface housing 22, a bottom housing 23, a plug wire body 24, a circuit board 25, at least one plug-in assembly 26, and at least one charging interface 27; the second fixed housing 21 is a hollow fixed cavity; the second rotatable surface housing 22 is movably arranged on a side of the second fixed housing 21 and is rotatable relative to the second fixed housing 21; the bottom housing 23 is arranged on the other side of the second fixed housing 21 and is fixedly connected to the second rotatable surface housing 22, and the bottom housing 23 is rotatable relative to the second fixed housing 21 driven by the second rotatable surface housing 22; the plug wire body 24 is movably wound on the second rotatable surface housing 22 and penetrates the second fixed housing 21, and the second rotatable surface housing 22 is rotatable to drive the plug wire body 24 to rotate, so as to achieve storage of the plug wire body 24; the circuit board 25 is fixedly arranged between the second rotatable surface housing 22 and the bottom housing 23; the at least one the plug-in assembly 26 is fixedly arranged on the bottom housing 23 and is electrically connected to the circuit board 25, and an electrical device can be electrically detachably connected to a corresponding plug-in assembly 26 by means of a socket; the at least one charging interface 27 is arranged on the circuit board 25 and penetrates the second rotatable surface housing 22, enabling charging of the electronic device by means of a corresponding charging interface 27. The circuit board 25 is further arranged with at least one indicator light (not shown), and the at least one the indicator light penetrates the second rotatable surface housing 22, which serves to indicate the working condition of the socket component.

Referring to FIG. 8, in the embodiments, a side of the second fixed housing 21 defines a second through hole 211; the plug wire body 24 penetrates the side of the second fixed housing 21 through the second through hole 211; the second rotatable surface housing 22 and the first rotatable surface housing 12 are of the same structure, without repeated description herein. In the embodiments, the bottom housing 23 includes an insulating body 231 and a hardware 232, where the hardware 232 is fixedly arranged on the insulating body 231, and the at least one the plug-in assembly 26 is arranged on the hardware 232; a bottom of the insulating body 231 is arranged with multiple second pads 2311 made of rubber; specifically, the second pads 2311 are made of silicone, which serve to increase the height of the bottom housing 23 and a contact surface.

It is to be noted that when the wire of the rotatable cable collection socket component of the present disclosure is required to be released, with the first fixed housing 11 or the second fixed housing 21, by pulling the plug wire body 13 or the plug wire body 24 with force, the plug wire body 13 or the plug wire body 24 can be extended from the first rotatable surface housing 12 or the second rotatable surface housing 22, so as to achieve the effect of releasing the wire; when the wire is required to be wound, by rotating the first rotatable surface housing 12 or the second rotatable surface housing 22, the first rotatable surface housing 12 or the second rotatable surface housing 22 drives the plug wire body 13 or the plug wire body 24 to wind, so as to achieve the effect of winding the wire.

The technical features of the above-described embodiments can be combined in any number of ways. For the sake of brevity, not all possible combinations of the technical features of the above-described embodiments have been described; however, as long as there are no contradictions in the combination of these technical features, they should be considered to be within the scope of this specification.

The above-described embodiments express only several embodiments of the present disclosure with more specific and detailed descriptions, but they are not to be construed as a limitation of the scope of the present disclosure. It should be noted that for those skilled in the art, a number of deformations and improvements can be made without departing from the conception of the present disclosure, which all belong to the scope of the present disclosure. Therefore, the scope of the present disclosure shall be subject to the attached claims.

What is claimed is:

1. A rotatable cable collection socket component, comprising:
   a fixed housing, being a hollow fixed cavity;
   a rotatable surface housing, movably arranged on a side of the fixed housing and rotatable relative to the fixed housing;
   a plug wire body, movably wound on the rotatable surface housing and penetrating the fixed housing;
   a cover plate or a bottom housing, fixedly arranged under the rotatable surface housing and rotatable driven by a rotation of the rotatable surface housing;
   a circuit board, fixedly arranged between the rotatable surface housing and the cover plate or the bottom housing;
   at least one plug-in assembly, fixedly arranged on the cover plate or the bottom housing and electrically connected to the circuit board, and an electrical device is capable of being electrically detachably connected to a corresponding plug-in assembly; and
   at least one charging interface, arranged on the circuit board and penetrating the rotatable surface housing, and the electronic device is capable of being charged through a corresponding charging interface;
   wherein a side of the fixed housing defines a through hole passing thruogh the side of the fixed housing, and the plug wire body penetrates the side of the fixed housing thrugh the thruogh hole.

2. The rotatable cable collection socket component according to claim 1, wherein at least one indicator light is arranged on the circuit board and penetrates the rotatable surface housing, configured to a working condition of the socket component.

3. The rotatable cable collection socket component according to claim 1, wherein the fixed housing and the rotatable surface housing are both made of insulating material and cooperatively form a hollow cylinder.

4. The rotatable cable collection socket component according to claim 3, wherein a bottom of the fixed housing or the bottom housing is arranged with a pad.

5. The rotatable cable collection socket component according to claim 1, wherein the at least one charging interface is one or more of a Micro USB interface, a Type-C interface, and a Lightning interface.

6. The rotatable cable collection socket component according to claim 5, wherein three the charging interfaces are arranged side by side on the circuit board, being a Micro USB interface, a Type-C interface, and a Lightning interface, respectively.

7. The rotatable cable collection socket component according to claim 1, wherein each plug-in assembly comprises a fire plug-in and a zero plug-in; the fire plug-in is electrically connected to a fire wire, and the zero plug-in is electrically connected to a zero wire.

8. The rotatable cable collection socket component according to claim 7, wherein each plug-in assembly further comprises a ground plug-in electrically connected to a ground wire.

9. The rotatable cable collection socket component according to claim 7, wherein three the plug-in assemblies are arranged symmetrically on the cover plate.

10. The rotatable cable collection socket component according to claim 1, wherein the rotatable surface housing comprises a housing body and a winding part; the winding part is arranged under the housing body, and the plug wire body is movably wound on the winding part.

11. The rotatable cable collection socket component according to claim 10, wherein the housing body defines at least one set of socket holes and at least one interface hole that pass through the housing body; a position and number of the at least one set of socket holes correspond to a position and number of the at least one plug-in assembly, respectively; a position and number of the at least one interface hole correspond to a position and number of the at least one charging interface, respectively.

12. The rotatable cable collection socket component according to claim 10, wherein a plurality of connection posts are arranged within the housing body, and the cover plate is fixed to an underside of the rotatable surface housing by means of screws cooperating with the plurality of connection posts.

13. The rotatable cable collection socket component according to claim 10, wherein the winding part is a ring-shaped structure with a plug wire hole defined throughout, and the plug wire body is electrically connected to the circuit board through the plug wire hole.

* * * * *